United States Patent [19]

Odero et al.

[11] Patent Number: 4,493,064
[45] Date of Patent: Jan. 8, 1985

[54] SONAR SYSTEM

[75] Inventors: Dominique Odero, Vincennes; Guy Parent, Le Plessis Robinson, both of France

[73] Assignee: Sintra-Alcatel, Asnieres, France

[21] Appl. No.: 399,577

[22] Filed: Jul. 19, 1982

[30] Foreign Application Priority Data

Jul. 17, 1981 [FR] France .................... 81 13961

[51] Int. Cl.³ .................... G01S 15/02; G01S 7/52
[52] U.S. Cl. .................... 367/92; 367/88; 367/101; 367/106
[58] Field of Search .................... 367/88, 92, 106, 101, 367/102

[56] References Cited

U.S. PATENT DOCUMENTS

| 3,005,973 | 10/1961 | Kietz | 367/106 |
| 3,458,854 | 7/1969 | Murphree | 367/101 |
| 3,585,578 | 6/1971 | Fischer, Jr. | 367/88 |
| 3,824,531 | 7/1974 | Walsh | 367/92 |
| 3,950,723 | 4/1976 | Gilmour | 367/88 |
| 4,075,599 | 2/1978 | Kosalos et al. | 367/92 |
| 4,216,537 | 8/1980 | Delisnieres | 367/88 |

FOREIGN PATENT DOCUMENTS 2011076 7/1979 United Kingdom.

Primary Examiner—Richard A. Farley
Attorney, Agent, or Firm—Sughrue, Mion, Zinn, Macpeak & Seas

[57] ABSTRACT

A sonar system comprises a vehicle (1) capable of moving over the bottom of an extent of water, with an emitter of acoustic pulses and a receiver of acoustic energy mounted on said vehicle. Signal processing and display circuitry (e.g. on board a surface vessel 2) are connected to receive signals representative of the acoustic waves emitted by the emitter, of the acoustic waves received by the receiver, and of parameters describing the motion of the vehicle. The signal processing and display circuitry generates an image of objects hidden in the water bottom on the basis of the signals. The emitter of acoustic pulses is provided with at least one parametric transducer having a spot radiation pattern capable of forming a plurality of channels that bathe spots of the water bottom in sound waves, and an electronic pointing system for scanning the channels.

9 Claims, 5 Drawing Figures

SONAR SYSTEM

The present invention relates to echo sounding or sonar systems, and more particularly to those for locating objects hidden at a shallow depth under the sea floor.

BACKGROUND OF THE INVENTION

Side scanning sonars are known for visualising the sea bed, and consequently for visualising objects resting thereon. These side scanning sonars analyze the sea bed by decomposing it into narrow juxtaposed strips corresponding to image scan lines, and by deducing the profile of each of these strips from the echo signal returned by the strip in response to an acoustic interrogation pulse. To do this, they comprise an emitter of acoustic pulses, a receiver of acoustic energy, and signal processing means for generating an image of the bottom on the basis of the signals from the emitter and the receiver. The emitter and the receiver are installed on board a vehicle in the form of a torpedo or fish which is moved at constant speed and at constant height over the sea floor. The emitter powers two emitting transducers which are symmetrically placed in the sides of the fish and each of which has a main radiation lobe directed sideways towards the sea bottom. This lobe is narrow in the direction of fish movement and broad transversely to said direction. By means of these two emitting transducers, each acoustic interrogation pulse bathes a narrow strip of the sea bottom extending perpendicularly to the direction of fish movement with sound. The sound reaches this strip initially in a zone close to vertically below the fish, and then reaches zones which are further and further therefrom, whereby the strip is scanned from its mid-point outwardly towards its ends. Between two interrogation pulses, the movement of the fish displaces sideways the narrow strip of sea bed liable to be bathed in sound, thereby enabling a large corridor of the sea bed to be surveyed by the fish. The receiver is connected to two receiving transducers analogous to the emitting transducers and pointed towards the narrow strip of sea bed which receives the sound from the emitter. Sometimes, each receiving transducer is in the form of a multiple beam transducer comprising an alignment of unit transducers capable of separating a plurality of longitudinal zones in the echos returned by the narrow strip receiving sound from the emitter, thereby enabling said strip which receives sound from the emitter to be broadened and hence enabling the fish to be moved faster. The separation is done by suitably processing the signals from the unit transducers.

To obtain an image of the bottom with suitably high resolution, it is necessary for the system of transducers to have a very narrow aperture in the direction of fish movement, and for a given size of transducer, this leads to high frequency interrogation pulses being used, eg. pulses at a frequency of about a megahertz. These pulses hardly penetrate into the sea bed at all, and they are therefore unsuitable for detecting objects hidden therein. Further, the sheet shaped lobes of the various transducers do not minimize ground reverberation, which therefore appears as a parasitic effect when attempting to detect hidden objects.

Preferred embodiments of the present invention provide a sonar system capable of detecting objects hidden at not too great a depth in the sea floor.

SUMMARY OF THE INVENTION

The present invention provides an emitter of acoustic pulses provided with at least one parametric transducer for forming a plurality of acoustic channels, and electronic pointing means for pointing the parametric transducer to scan said channels, said parametric transducer being mounted in a vehicle which moves above the bed of a body of water and bathes zones of said bed in sound;

A receiver of acoustic energy equipped with at least one receiver transducer mounted on said vehicle and pointed towards said zones of the water bed which receive sound from said parametric transducer; and Signal processing means to provide an image of objects hidden in the bed.

A sonar system in accordance with the invention may also include some or all of the following features.

The parametric transducer is pointed towards the water bottom with an angle of incidence which is less than 70° to avoid parasitic echos due to specular reverberation from the bottom.

Each channel forming parametric transducer is kept pointing constantly in an inclined plane which intercepts the water bottom transversely to the direction of movement of the vehicle, either ahead of or astern of said vehicle. This enables the bottom to be completely covered, even vertically below the vehicle while complying with the preceding condition concerning the angle of incidence.

In a preferred embodiment of the sonar system, there are two identical channel forming parametric transducers, disposed on either side of the vehicle and having their channels coupled in pairs in such a manner as to point in diverging directions that facilitate separation of the echos returned by the two zones which receive sound simultaneously. The system also has two identical receiver transducers disposed on either side of the vehicle and each directed towards the zones of the water bottom which are bathed in sound by the parametric transducer on the same side of the vehicle.

BRIEF DESCRIPTION OF THE DRAWINGS

An embodiment of the invention is described by way of example with reference to the accompanying drawings in which.

MORE DETAILED DESCRIPTION

Figure 1:
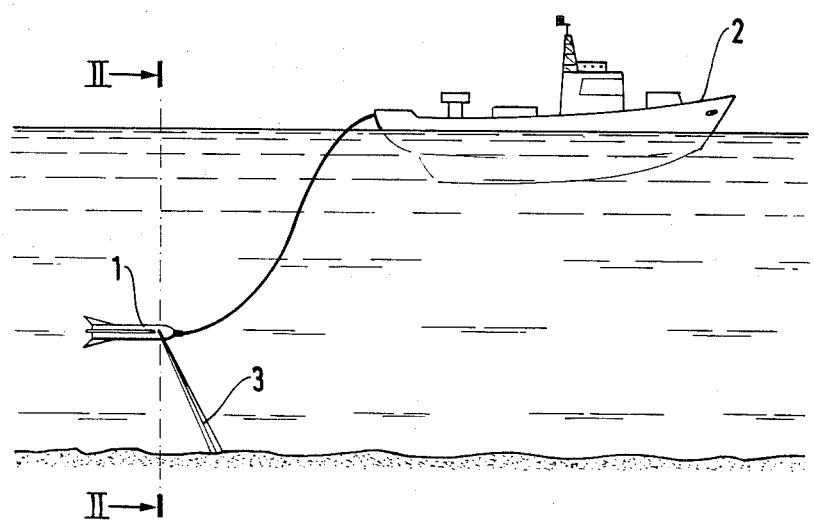
FIG. 1 is a diagrammatic vertical longitudinal section thru a sonar installation in operation over a search site.
Figure 2:
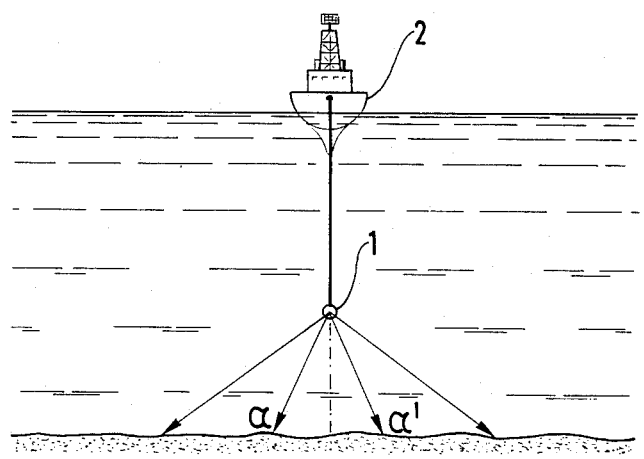
FIG. 2 is a diagrammatic transversal vertical section along a line II—II in FIG. 1.
Figure 3:
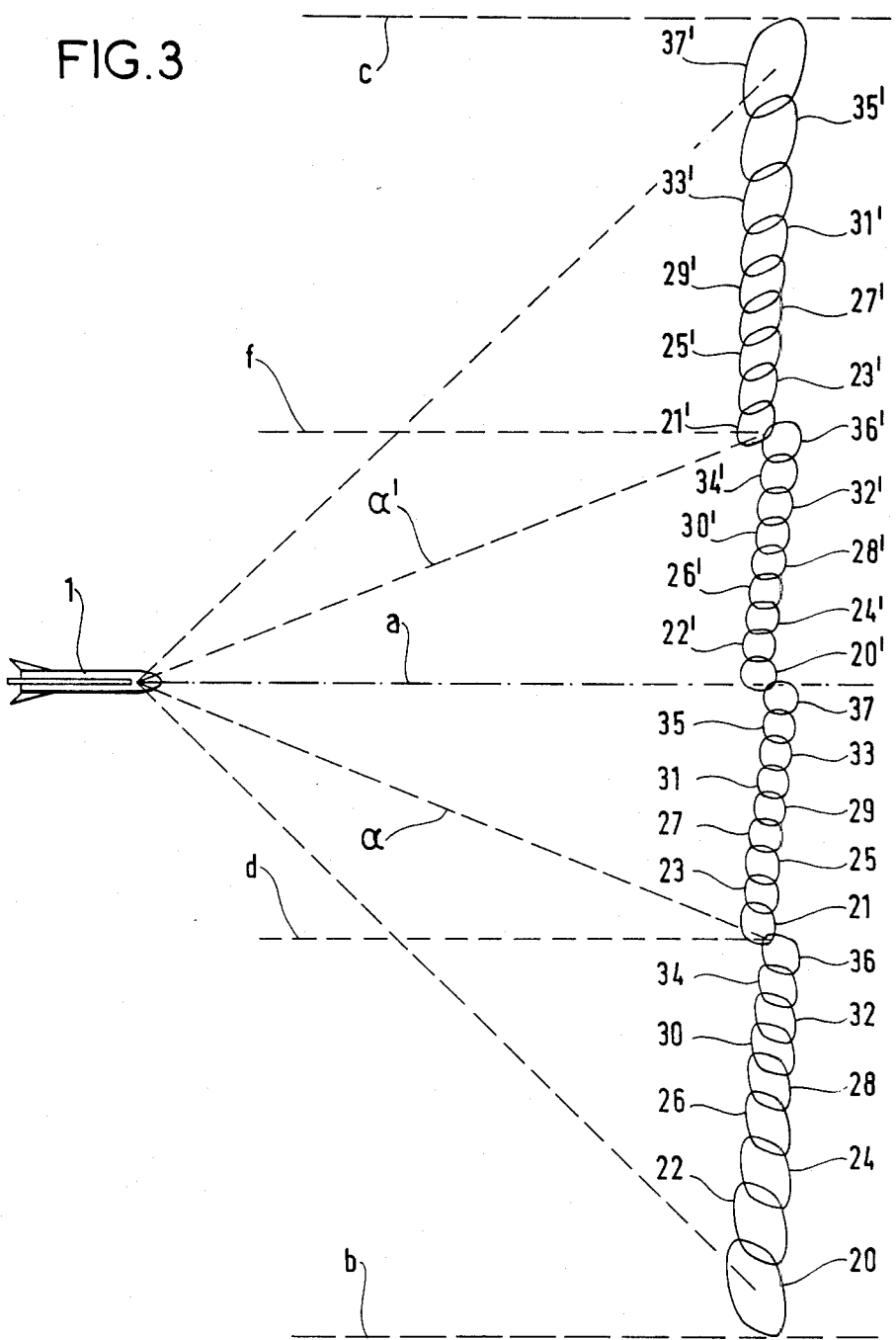
FIG. 3 is a plan view of the vehicle carrying the emitter and the receiver shown in the preceding figures.

FIGS. 1 to 3 show the implementation of a sonar system in accordance with the invention. The system is partly installed in a submerged torpedo-like vehicle 1 referred to as a "fish", and partly in a surface vessel 2 which tows the fish. The fish 1 moves at a constant height above the bottom and houses the transducers for sending acoustic interrogation pulses and for receiving acoustic energy reflected by the bottom. The surface vessel or boat 2 is equipped with a signal transmission system connecting it to the transducers in the fish 1 and with signal processing and display equipment 100 which processes the signals emitted and received by the fish 1 together with signals representative of its motion, to provide an image of objects hidden in the bottom over which the fish 1 is passing.

To explore the bottom, the system uses pulses of acoustic energy at a sufficiently low frequency, e.g., several tens of kilohertz, to penetrate the bottom, together with pulses of acoustic energy at a high frequency, e.g., several hundreds of kilohertz, which, in practice, do not penetrate the bottom. The low frequency acoustic energy pulses are generated by the parametric effect from the high frequency acoustic pulses and proceed to bathe small surface areas of the bottom with sound at an incidence of less than 70° to reduce the area of the bottom liable to reverberate low frequency acoustic energy pulses and to avoid reflections from the bottom. Echos of high frequency acoustic energy due solely to reverberation from the bottom are used to eliminate components in the low frequency acoustic energy echo due to reverberation from the bottom.

The transducers are grouped in pairs, with the two transducers of each pair being identical and disposed symmetrically on either side of the fish 1, one to starboard and one to port, and they are oriented sideways towards the bottom. There are one pair of emission transducers and two pairs of reception transducers. Each of the emission transducers has a spot radiation pattern, i.e. a pattern having an aperture of a few degrees, and this pattern is electronically pointable in a plane 3 which intercepts the bottom transversely to the trajectory of the fish 1, either ahead of or astern from said fish. One of the pairs of receiver transducers, or hydrophones, is sensitive to low frequency acoustic energy while the other pair is sensitive to high frequency acoustic energy. Each receiver hydrophone has a radiation pattern with a distinctly larger aperture than the radiation pattern of the emission transducers, but which is likewise electronically pointable to cover the surface of the bottom bathed in sound by the emission transducers situated on the same side of the fish 1.

The emission transducers are of the parametric type which enables them to simultaneously generate acoustic pulses of high frequency and of low frequency and also to obtain high directivity for the low frequency pulses. These transducers are also channel forming antenna, i.e. they are electronically pointable.

Parametric transducers for sonar are well-known in the art. Reference may be made on this subject, for example, to an article by Dominique ODERO entitled "Possibilités et limites des antennes paramétriques émettrices" which appeared in the proceedings of the 7th GRETSI Colloquium (Nice, June 1979). In this type of transducer, an acoustic signal at frequency $F_1$ is obtained by simultaneously emitting two acoustic signals at higher frequencies $F_2$ and $F_3$ having a beat frequency $F_1$. The beat is obtained by virtue of non-linear propagation characteristics for acoustic waves in water. Both high frequency acoustic signals can be emitted from a single electroacoustic transducer which is excited by a mixture of two electrical signals at said frequencies, whereby a parametric sonar transducer may have the same configuration as a conventional sonar transducer for use at high frequencies and may thus retain the directivity thereof for the parametric effect. Since the aperture angle of the beam of radiation from the antenna is approximately lambda divided by L radians (where lambda is the wavelength of the radiation and L is the size of the transducer in a direction perpendicular to the plane of the aperture angle), use of the parametric effect results in a large gain in directivity. Thus, a square electro-acoustic transducer with a side of 25 centimeters excited by a mixture of two electrical frequencies of several hundreds of kilohertz and having a beat frequency of several tens of kilohertz can be used to obtain a parametric emission of an acoustic signal at said beat frequency with a spot beam having an aperture angle of about 3.6°, making it possible to bathe an area of about 1 square meter with sound at a distance of 15 meters.

The channels are formed in a conventional manner by making each transducer from a regular alignment of transducers which are excited with different versions of the same signal that have suffered different delays before being applied to the transducer. These delays are determined by an electronic pointing apparatus 102. As is well-known, such as arrangement provides a principal direction of radiation which is perpendicular to the transducer when all of the transducers are excited by the same version of the signal, the direction of the beam is deflected towards one end of the transducer when each transducer is excited a little later relative to the adjacent transducer in the direction of said end. The deflection angle is expressed by the well-known relationship:

$$\sin \beta = (N \Delta c / D)$$

where N is the number of transducers in the alignment, $\Delta$ is the unit delay between two consecutive transducers in the alignment, c is the speed of the wave in the medium, and D is the length of the alignment. By giving quantified values to the delay, $\Delta$, a plurality of different main directions of radiation can be defined thereby defining the channels of the transducer in question.

Using the above parametric antenna having a transducer based on a square with a side of 25 centimeters, channels are formed by dividing the transducer into independent lines at a spacing less than the half wavelength of the high excitation frequencies, and by feeding the line transducers via an electronic pointing device 102 which inserts a unit delay between each of them. Varying the unit delay in the electronic pointing device serves to vary the direction of the main beam from the parametric transducer in a plane perpendicular to the transducer as a whole and to the direction of the transducer lines. A greater or lesser sector of the resulting plane is covered by giving the unit delay $\Delta$ a certain number of discrete values corresponding to main radiation directions which are separated by an angle which is less than the aperture angle of the beam radiating from the parametric transducer.

Figure 4:
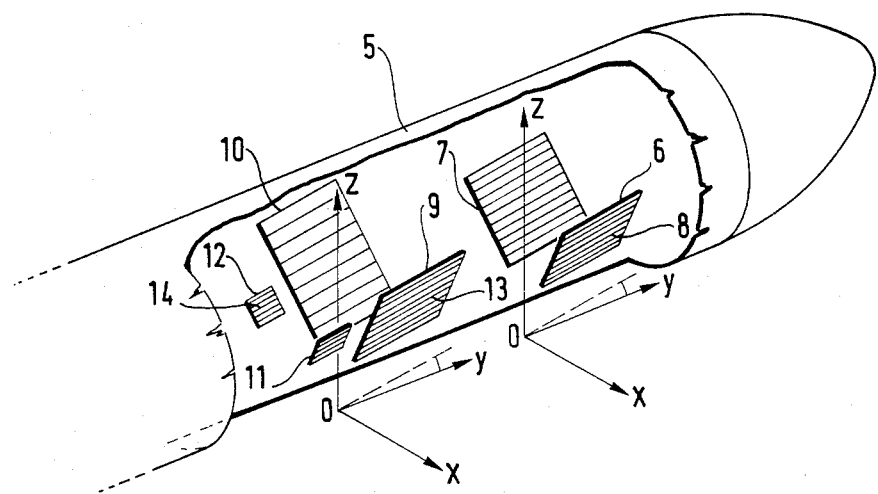
FIG. 4 is a partially cut-away perspective diagram showing the disposition of the sonar transducers in the vehicle.

FIG. 4 shows the disposition of the sonar transducers in the fish 1, which has a generally cylindrical hull 5 housing the transducers. The emission transducers are formed by two identical transducers 6 and 7 having a square plane base constituted by juxtaposing a plurality of line transducers 8. The planes are at an angle to each other. A first frame of reference OXYZ with an axis OY indicating the direction of fish movement, and an axis OZ indicating the vertical going upwards, serves to define the orientation of the emission transducers and shows that they are disposed symmetrically about a vertical plane parallel to the direction of fish movement and at an angle to each other such that the line of intersection of said planes (when projected) is below the line transducers 8, is parallel thereto and is inclined to the horizontal by an angle of 25° with the end towards the front of the fish 1 being raised. The beams of radiation from the two send transducers have a common orientation plane which intersects the bottom perpendicularly to the direction of fish movement, ahead of the fish and at an angle of incidence of 65° as shown at 3 in FIG. 1. The two transducers 6 and 7 with their square plane bases for the emission transducers are at an angle of 60° to each other. By virtue of this positioning arrangement, the main radiation directions $\alpha$ and $\alpha'$ from the emission transducers when their line transducers 8 are synchronously excited are also at an angle of 60° in the common orientation plane, each lying in this plane over a range of 30° on either side of the trajectory of the fish 1. It is possible to continuously bathe the bottom in sound over a corridor centered on the trajectory of the fish 1, by forming channels defining main radiation directions at a unit angular separation of less than 3.6°, over a range of 30° on either side of the main radiation directions $\alpha$ and $\alpha'$.

The bottom is bathed in sound by scanning a zone of small surface area simultaneously to starboard and to port of the fish 1 by connecting the emission transducers in parallel at the output of a common electronic pointing device. To do this the nth line transducer 8 from the top edge of one of the emission transducers is connected in parallel with the nth line transducer from the bottom edge of the other emission transducer. This parallel connection couples the channels of the emission transducers in pairs at a constant angle of 60° between the paired channels. A constant angular separation of 60° makes it possible to separate the simultaneously returned echos simply by using suitably directive receiver hydrophones.

The bottom is bathed in sound by means of acoustic interrogation pulses emitted by the emission transducers towards distinct points of small surface area by combining two scanning techniques: the channels from the emission transducers are changed between each pulse sent out under the control of the electronic pointing device, and the fish moves transversely thereto. To accelerate this coverage, and consequently to increase the speed at which the fish can be used to search, the acoustic interrogation pulses are grouped into trains of two successive pulses each of which is followed by a period of silence during which the return echos from the two pairs of small surface area zones are received successively. The emission transducer channels are scanned by means of the electronic pointing device in an order which imposes an angular separation of about 30° between the emission of two successive pulses in the same train, thereby providing a degree of separation in the return echos by virtue of the directivity of the receive hydrophones. FIG. 3 shows how the bottom is divided up into small surface area zones by such scanning. The fish 1 searches a corridor along the bottom which is centered on the projection of its trajectory onto the bottom. The limits of the corridor are indicated by dashed lines b and c which correspond to the limits of sideways range for the emission transducers. This passage is itself subdivided into four longitudinal strips by the projection of the trajectory of the fish 1 on the bottom, and by two parallel lines d and f formed by points on the bottom seen by the emission transducers when looking in their principal radiation directions $\alpha$ and $\alpha'$ as the fish moves. Each of these four strips is further subdivided by scanning through the channels of the emission transducers such that each strip comprises nine successive juxtaposed strips of small surface area drawn out by the movement of the fish 1. All the longitudinal strips are scanned laterally in the same direction. The longitudinal strip delimited by the lines b and d to the starboard of the fish 1 is scanned simultaneously with the longitudinal strip delimited by the lines a and f to port of the fish 1 by means of the first acoustic pulses in each train. The longitudinal strip delimited by the line d and a to the starboard of the fish 1 is scanned simultaneously with the longitudinal strip delimited by the lines f and c to the port of the fish 1 by means of the second acoustic pulses of each train. The zones of small surface area which are bathed in sound by the interrogation pulses are referenced on FIG. 2 to the starboard of the fish 1 by the numbers 20 to 37 in their order of interrogation, and to the port of the fish 1 they are referenced by the same numbers plus a dash or prime, such that two zones bearing the same reference number on either side of the fish 1 are simultaneously interrogated by the emission transducers.

As can be seen in FIG. 4, both pairs of reception hydrophones have much the same general configuration and orientation as the pair of emission antennas. Each reception hydrophone pair comprises two transducers having a square plane base 9 or 10 or 11 or 12, each constituted by a juxtaposition of line transducers 13 or 14 and disposed at an angle of 60° symmetrically arranged about a vertical plane parallel to the direction of fish movement. The planes if projected intersect along a line parallel to the transducers 13 or 14 as the case might be, below the transducer planes and inclined relative to the horizontal by an angle of 25° with the leading end being raised. Both plane base transducers 9 and 10 or 11 and 12 of each pair of reception hydrophones have their line transducers 13 or 14 connected in parallel in the same manner as the line transducers of the plane base transducers 6 and 7 of the pair of emission transducers. Each pair of reception hydrophones is connected to a beam forming circuit 106 which provides electronic pointing by summing the signals delivered by an alignment of the line transducers 13 or 14 after applying suitable relative delays thereto as a function of the position of the line transducer in the alignment giving rise to the signals. Since the distances between the pairs of hydrophones in the fish 1 are negligible compared to the distance separating the fish 1 from the bottom, the planes scanned by the pairs of reception hydrophones are not only parallel to the orientation plane 3 scanned by the emission transducers, but may be considered to be the same plane. Thus the reception hydrophones can scan in the same manner as the emission transducers.

The pair of reception hydrophones that is sensitive to low frequency acoustic energy reflected from beneath the bottom are the larger pair of hydrophones having a side of about 35 centimeters and a beam aperture angle of about 15° at about 10 kilohertz. The pair of reception hydrophones sensitive to high frequency acoustic energy reflected by the surface of the bottom has smaller plane base transducers 11 and 12 with a side of about 4 centimeters to give the same aperture angle of about 15° at about 100 kilohertz.

The reception hydrophones have multiple orientations at the same time, i.e. they have several simultaneous channels, because the orientation or formation of the channels results from a beam forming circuit processing the signals received by the line transducers, and this processing is carried out in parallel in various manners. This property is taken advantage of to simultaneously orient each reception hydrophone in two different directions during reception of echos caused by the train of two successive acoustic pulses, a first direction pointing towards the small surface area to port or starboad of the fish 1 which is bathed in sound by the first acoustic pulse and a second direction pointing towards the small surface area zone to port or starboard of the fish 1 which is bathed by the second acoustic pulse.

The directivity of the reception hydrophones is sufficient to separate echos from the two zones of the bottom which are bathed in sound simultaneously since these zones are separated by an angle of 60° as seen from the fish 1. The directivity may, however, be insufficient to separate the echos coming from two zones of the bottom bathed by two successive pulses which appear at the fish to be separated by an angle of only 30°. In this case, it is advantageous to distinguish the two successive pulses of the same train by a code which can be detected in their respective echos and thereby enables the acoustic pulses to be distinguished. The acoustic pulses can be distinguished by modulating their frequency linearly, the first pulse of a train being modulated with an instantaneously rising frequency in a "chirp-up" modulator 108 while the second pulse of each train is modulated with an instantaneously falling frequency in a "chirp-down" modulator 110.

Figure 5:
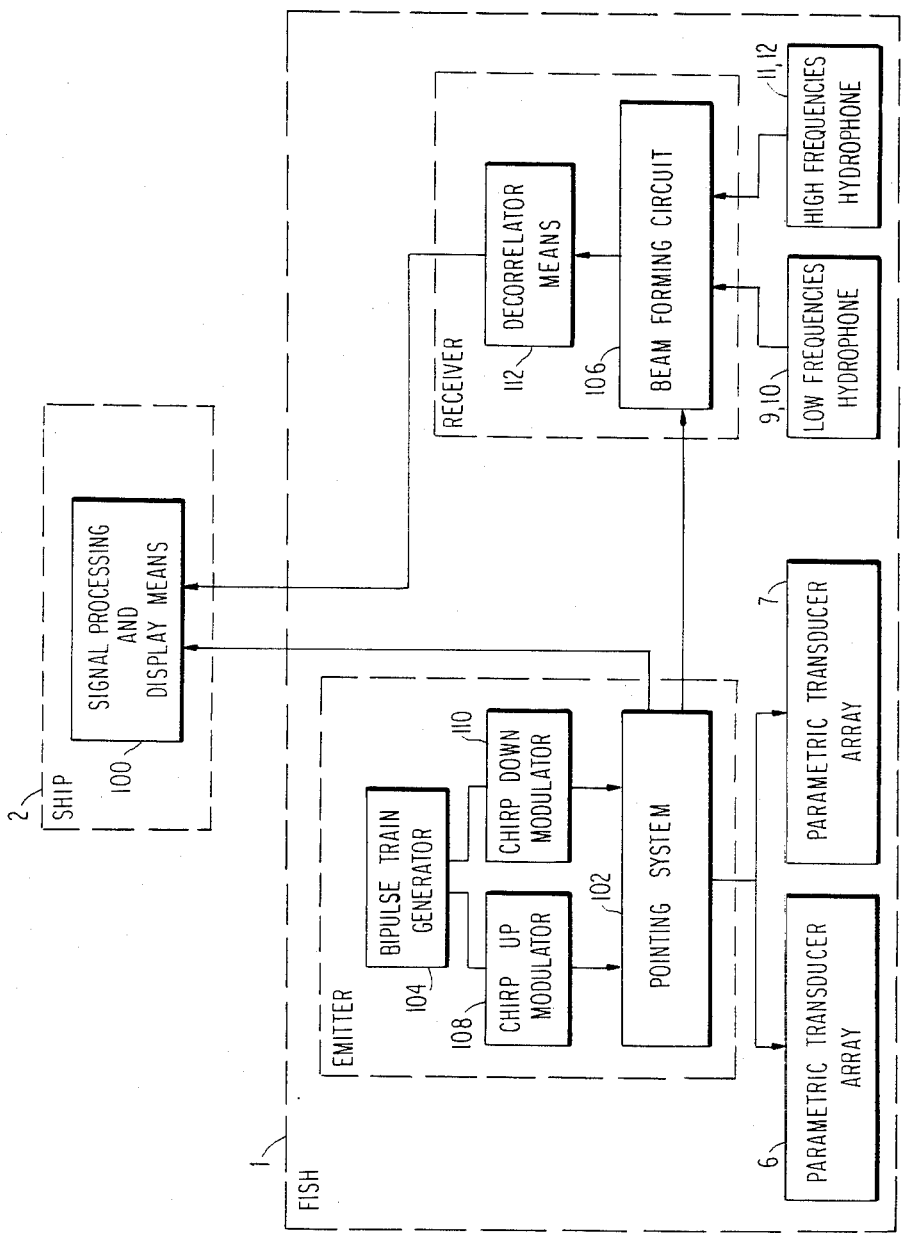
FIG. 5 is a brief block diagram of essential components of the sonar system according to the present invention.

The signal processing and display device uncorrelates the high and low frequency echos from each small surface zone that is bathed in sound on the bottom, calculates the energy of the uncorrelated components for each low frequency echo, and provides an image on which each point or spot has a shade that is a function of the energy of the uncorrelated components of the low frequency echo returned by the corresponding small area of the bottom. Conventional signal processing and display techniques are used to do this. For convenience, the decorrelating means 112 is illustrated in the receiver in FIG. 5.

We claim:

1. A sonar system, comprising: a vehicle capable of moving over the bottom of an extent of water; an emitter of acoustic pulses and a receiver of acoustic energy mounted on said vehicle, said emitter of acoustic pulses comprising at least two parametric transducer arrays each generating a scanning beam having a spot radiation pattern and steerable in a plurality of directions for forming a plurality of channels, said two transducer arrays being disposed laterally, one on each side of said vehicle, and coupled channel-by-channel in an arrangement providing two diverging pointing directions at all times; and an electronic pointing system for selecting and scanning through said channels.

2. A sonar system according to claim 1, wherein said emitter includes means for delivering a train of two successive acoustic pulses which are differently coded, one of said successive acoustic pulses being linearly frequency modulated with an increasing instantaneous frequency and the other of said successive acoustic pulses being linearly frequency modulated with a decreasing instantaneous frequency and followed by a period of silence during which return echos are received.

3. A sonar system according to claim 1, wherein said two parametric transducer arrays are pointed towards the water bottom with their scanning beams striking said water bottom with an angle of incidence that is less than 70° at all times.

4. A sonar system according to claim 3, wherein said two parametric transducer arrays are pointed towards the water bottom with their scanning beams in a plane which intercepts the water bottom transversely to the direction of vehicle motion, either ahead of or astern of said vehicle.

5. A sonar system according to claim 1, wherein the two parametric transducer arrays include means for connecting their channels together in pairs for forming a constant angle between said pointing directions at all times.

6. A sonar system according to claim 2, wherein said electronic pointing system includes means for directing each of the successive pulses of a train to two different channels separated by a constant pointing angle.

7. A sonar system according to claim 1, wherein both of the parametric transducer arrays are constituted by identical base planes comprising a juxtaposition of line transducers, said planes being symmetrically disposed about a vertical plane parallel to the direction of vehicle motion and lying at an angle to each other such that the line of intersection between the projections of said planes is parallel to the line transducers and inclined to the horizontal.

8. A sonar system according to claim 7, wherein the base planes of the two parametric transducer arrays are at about 60° to each other with their line of intersection rising towards the front of the vehicle at an angle of about 25° to the horizontal.

9. A sonar system according to claim 1, including a receiver provided with two reception hydrophones: a high frequency hydrophone sensitive to the high frequencies emitted by the parametric transducer arrays; and a low frequency hydrophone sensitive to beats at a frequency below the high frequencies emitted by the parametric transducer arrays, wherein said receiver further includes means for eliminating components of the low frequency echo that are correlated with the high frequency echo.

* * * * *